UNITED STATES PATENT OFFICE.

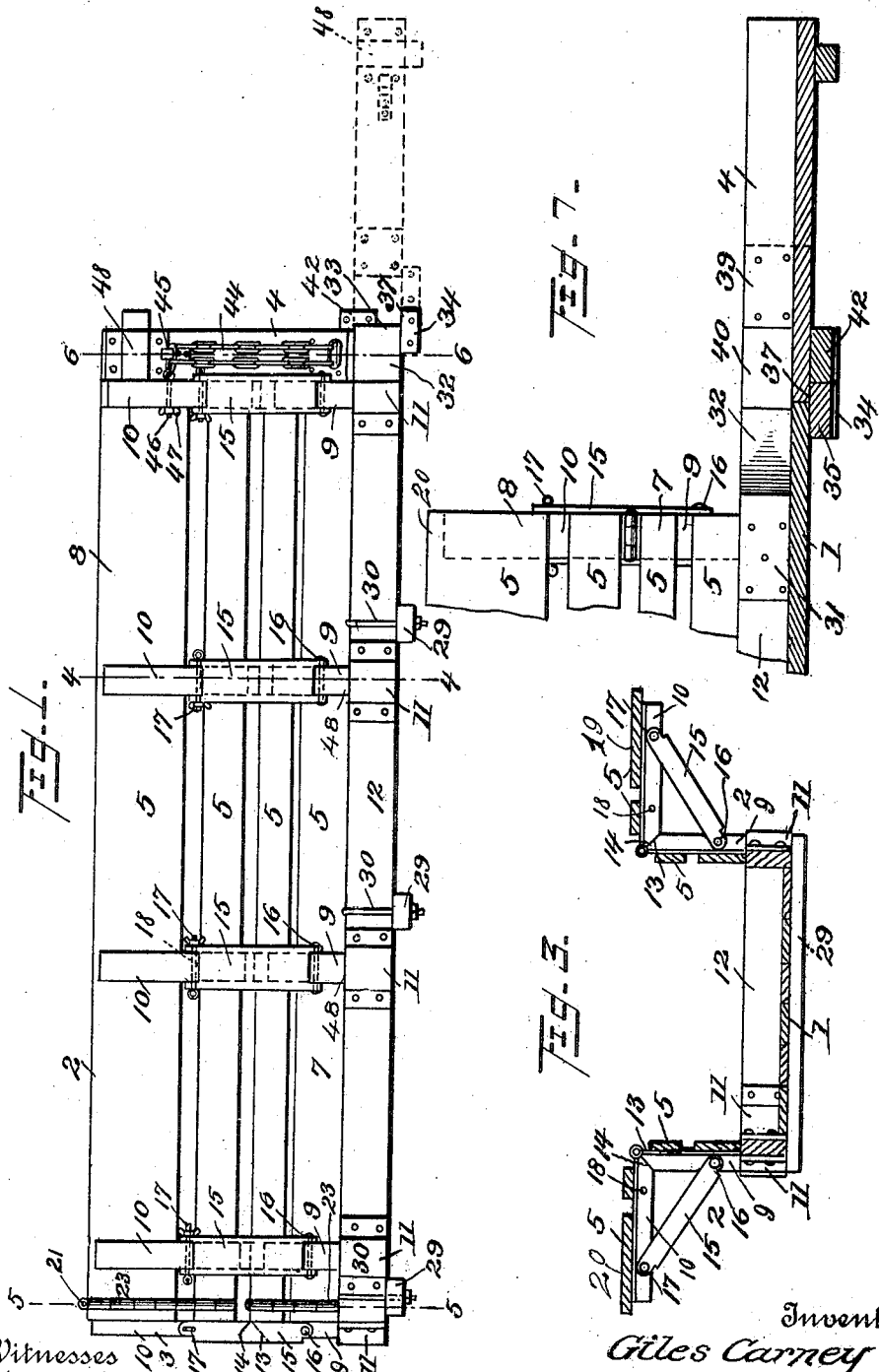

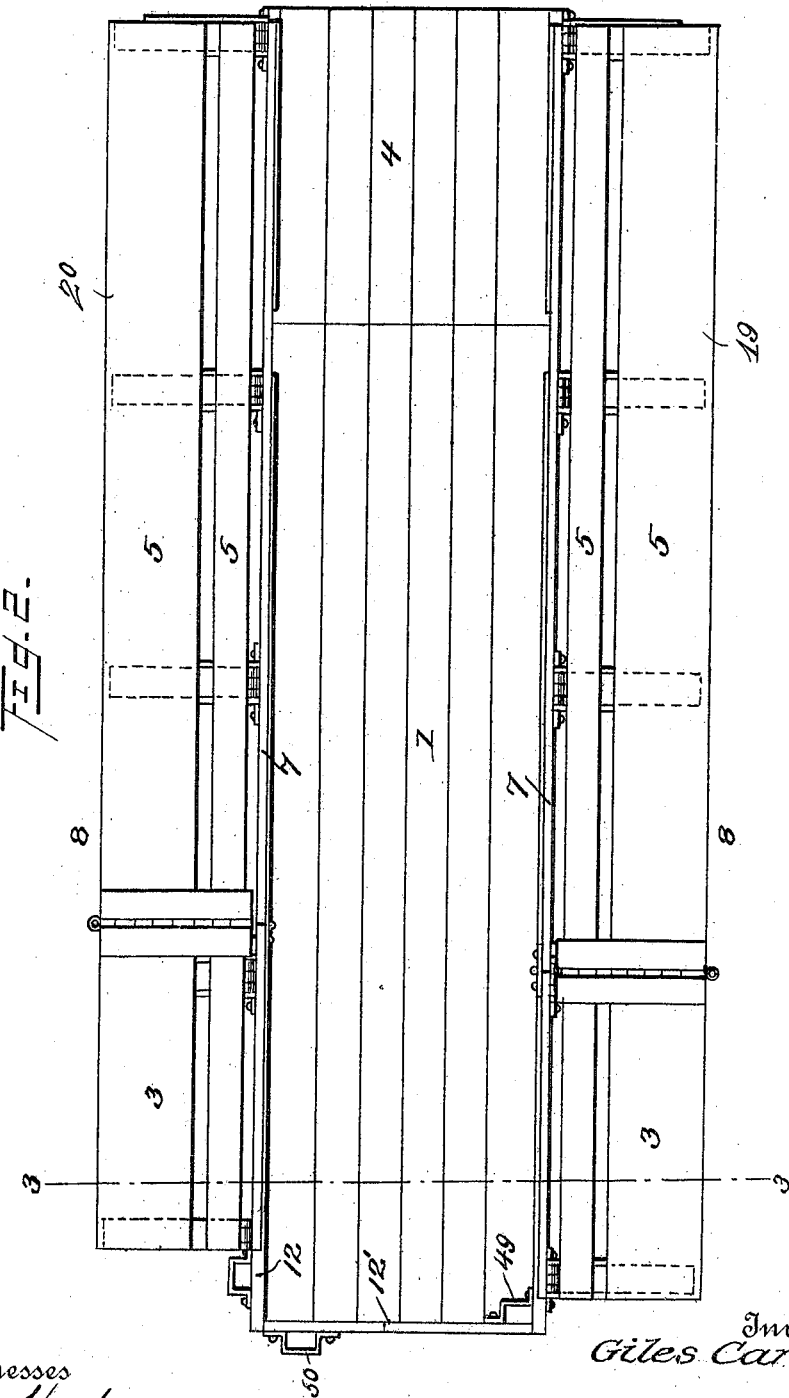

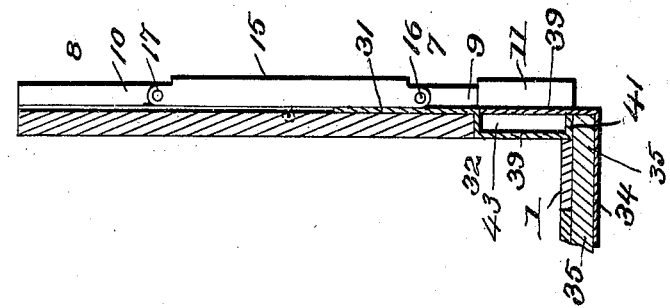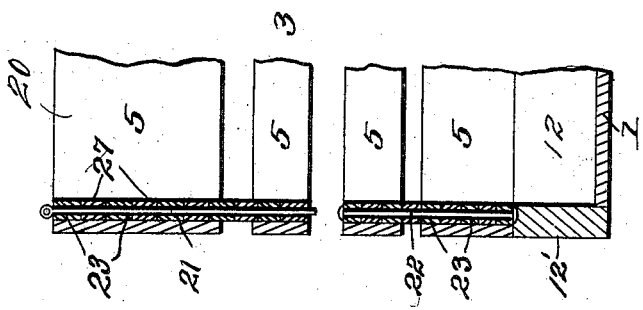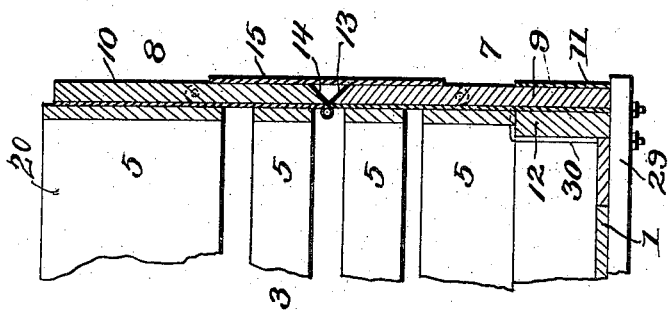

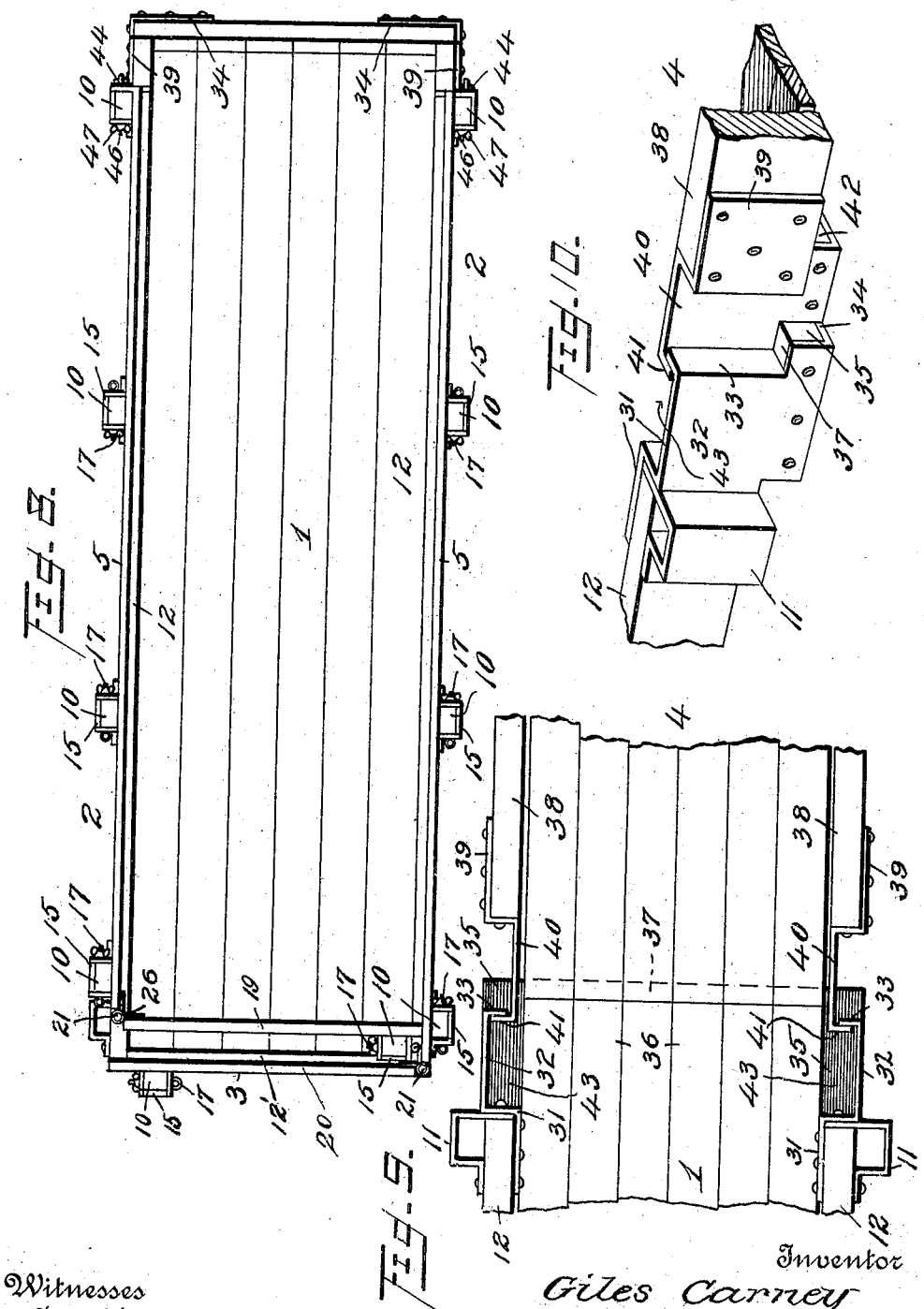

GILES CARNEY, OF PARIS, ILLINOIS.

HAY-RACK.

988,173.

Specification of Letters Patent. Patented Mar. 28, 1911.

Application filed February 24, 1910. Serial No. 545,598.

*To all whom it may concern:*

Be it known that I, GILES CARNEY, a citizen of the United States, residing at Paris, in the county of Edgar and State of Illinois, have invented certain new and useful Improvements in Hay-Racks; and I do declare the following to be a full, clear, and exact description of the invention, such as will enable others skilled in the art to which it appertains to make and use the same.

This invention relates to hay racks.

The principal object of the present invention is to provide a vehicle construction in which the sides and front end of the body are composed of hinged sections, whereby when the upper sections are in raised or vertical position the body of the vehicle will form an ordinary stock or wagon body and whereby when said sections are in horizontal position the body will be converted into a hay rack.

A further object of the invention is to provide means for supporting the upper sections of the body in horizontal or rack-forming position.

A still further object of the present invention is to provide an adjustable rear end gate which may be entirely removed from position, should occasion necessitate and which when swung down into horizontal position forms a continuation of the bed of the rack.

A still further object of the invention is to provide a body construction which may be entirely removed from the bed of the vehicle.

With the foregoing and other objects in view, the invention consists of certain novel features of construction, combination and arrangement of parts, as will be more fully described and particularly pointed out in the appended claims.

In the accompanying drawings, Figure 1 is a side elevation of the body of the vehicle embodying my improvements, with the hinged sections forming the sides and front end wall of the body in vertical position, the dotted lines indicating the horizontal or lowered position of the end gate. Fig. 2 is a plan view of Fig. 1, with the hinged sections in horizontal or rack-forming position. Fig. 3 is a vertical transverse section taken on the line 3—3 of Fig. 2. Fig. 4 is a vertical transverse section taken on the line 4—4 of Fig. 1, the parts being represented on an enlarged scale. Fig. 5 is a similar view taken on the line 5—5 of Fig. 1, the parts being also shown on an enlarged scale. Fig. 6 is a vertical transverse section taken through the rear end gate on the line 6—6 of Fig. 1, with the gate in vertical or closed position. Fig. 7 is a longitudinal section taken through the rear end of the bed of the body and the rear end gate with the latter in lowered position. Fig. 8 is a plan view of Fig. 1, with the hinged sections of the side pieces and the end gate swung up to form an ordinary wagon body. Fig. 9 is a plan view of the rear end of Fig. 8, with the end gate swung down and the parts represented on an enlarged scale. Fig. 10 is a fragmentary perspective view, showing the means of connection between the end gate and the rear end of the wagon body.

Referring to the drawings for a more particular description of the invention, 1 indicates the bed or bottom of the body, 2 the sides thereof, 3 the front wall of the body and 4 the end gate. The sides 2 of the body consist of a plurality of longitudinal strips or bars 5 and comprise the lower stationary sections 7, and upper hinged sections 8. The strips or bars forming the lower sections of the sides are secured to the vertical supporting bars 9, while the strips or bars forming the hinged sections of the sides are secured to the upper hinged sections, as 10 of said supporting bars 9. The lower ends of the bars 9 are received by the approximately U-shaped metal keepers 11 secured to the outer faces of the side and front pieces 12 and 12', respectively, of the bed. The inner or adjacent ends of the pivoted and stationary sections of the supporting bars 9 are beveled as indicated at 13 and 14, to allow the hinged sections of said bars to swing outwardly into an approximately horizontal position as indicated in Figs. 2 and 3 of the drawings when the body is to be converted into a rack. The hinged sections of the body are supported in horizontal or rack-forming position by the supporting links 15 pivoted at their lower ends as at 16 to the lower sections of the supporting bars 9 and engaged at their opposite ends with hinged sections of said bars by the transverse pins 17. The hinged sections of the bars 9 are also provided with the transverse apertures 18 which register with the apertures of the upper ends of the links 15 when the hinged sections of the sides are in vertical position. Under these conditions, the pins 17 are inserted through the upper ends of the links 15 and the apertures 18. The pivoted and stationary sections of the side pieces of the body are provided with the pivoted front sections 19 and 20, the purpose of which will presently appear. The front sections are preferably pivoted to the main portions of the side members by the pivot pins 21 and 22, respectively, which pass through interlocking knuckles 23 formed on the pivoted and main sections of the side pieces.

A pair of keeper plates 31 are riveted or otherwise secured to the inner faces and rear ends of the bars 12 of the bed and are provided with the offset portions 32 which are approximately disposed in alinement with the outer faces of said bars and project rearwardly beyond the same with their rear ends bent inwardly to provide the inwardly extending flanges 33, the purpose of which will presently appear. The offset portions 32 of the keeper plates 31 are also provided with the inwardly bent portions 34, which fit under opposite ends of the cross bar 35, whereby said offset portions are held against displacement. The rear edge of the cross bar 35 projects beyond the strips 36 forming the bed, providing a flange 37, the purpose of which will be disclosed.

The side pieces 38 of the end gate are provided with the bearing plates 39 provided with the depending inwardly offset portions 40 provided at their lower or inner ends with the outwardly bent flanges 41. A cross bar 42 extends beneath the body of the end gate with its lower edge spaced a slight distance from the lower end of said body. When the end gate is swung down into horizontal position, the flanges 41 thereof interlock with the flanges 33 of the keeper plates 31, while the projecting portion of the body of the end gate fits upon the flange 37 formed by the rearwardly projecting portion of the cross bar 35 and the inner edge of the cross bar 42 fits against the rear edge of the cross bar 35. By providing the cross pieces 35 and 42, respectively, and forming flanges as above described, the strain which would otherwise be exerted upon the interlocking flanges 33 and 41 is substantially removed. When the end gate is swung into vertical or closed position, the flanges 41 fit in the spaces 43 between the side edges of the body portion of the bed and the inner faces of the offset portions 32 of the keeper plates 31. Chains 44 have their lower ends connected with keepers 45 on the end gate and their opposite ends connected with the eyed rods 46 provided with the thumb screws 47.

When the body is to be used as a rack, the end gate is swung down into the position indicated in dotted lines in Fig. 1 to form a continuation of the bed of the body, while the upper or hinged sections of the side members of the body are also swung down in horizontal or rack-forming position to form a more extended surface for the hay. Under these conditions, the stationary sections of the rearmost supports 9 are placed in the keepers 48 of the end gate, while the pivoted front sections 19 and 20 are arranged in alinement with the main sections of the side pieces of the body, (see Fig. 2). When the body is to be converted into a wagon body for ordinary usage other than for the carrying of hay, or like substances, however, the end gate is swung in vertical or closed position, while the body is lifted, as a whole, from the bed and moved one notch forward, i. e., the rearmost of the supports 9 are placed in the keepers 11 at the rear ends of the side pieces 12 of the bed, while the position of the other supports is correspondingly changed. Also, under these conditions, the pivoted front sections 19 and 20 are swung inwardly at right angles to the main sections of the side pieces of the body to form the front wall of the body and the stationary sections of their supports 9 are engaged with the keepers 49 and 50 arranged respectively, at the inner and outer faces of the cross piece 12' of the wagon bed.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claims.

What is claimed is:

1. In a vehicle, the combination of a body, an end gate mounted thereon to swing from vertical to horizontal position, combined side and rack members detachably and adjustably mounted on the side portions of the body whereby said members may be adjusted longitudinally with respect to the body, each of said members consisting of front and rear sections, hinges uniting the adjacent ends of the two sections whereby when the members are in one position on the body their front sections may be swung transversely with respect to the body to close the front end of the latter, each of said sections being composed of lower relatively stationary portions, and upper swinging portions hingedly connected to said stationary portions and means for rigidly uniting the swinging and stationary portions of the sections.

2. In a vehicle, the combination with a body provided with side walls and open front and rear ends, stake sockets on said side walls, a swinging end gate mounted on the rear end of the body to swing from vertical to horizontal position, combined side and rack members, each composed of front and rear sections hingedly connected to each other by vertical pivots, and each of said sections in turn being composed of lower, relatively stationary portions, and upper swinging portions hingedly connected to said stationary portions, means for maintaining the swinging and stationary portions of the sections in adjusted positions with respect to each other, and stakes carried by the lower relatively stationary portions of the members and adapted to be interchangeably arranged in said stake sockets whereby the members may be adjusted longitudinally with respect to the body to permit the front sections of the members to be swung transversely across the body and close its front end when said members are in one position.

In testimony whereof I have hereunto set my hand in presence of two subscribing witnesses.

GILES CARNEY.

Witnesses:
 FRANK T. O'HAIR,
 WIGFALL S. O'HAIR.

Copies of this patent may be obtained for five cents each, by addressing the "Commissioner of Patents, Washington, D. C."